United States Patent
Ishida

(10) Patent No.: US 8,984,141 B2
(45) Date of Patent: Mar. 17, 2015

(54) SERVER FOR ROUTING CONNECTION TO CLIENT DEVICE

(75) Inventor: Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 2062 days.

(21) Appl. No.: 11/596,994

(22) PCT Filed: May 20, 2005

(86) PCT No.: PCT/JP2005/009280
§ 371 (c)(1),
(2), (4) Date: Sep. 18, 2007

(87) PCT Pub. No.: WO2005/114926
PCT Pub. Date: Dec. 1, 2005

(65) Prior Publication Data
US 2011/0138058 A1    Jun. 9, 2011

(30) Foreign Application Priority Data
May 20, 2004   (JP) ................................ 2004-150681

(51) Int. Cl.
*G06F 15/16*       (2006.01)
*H04L 12/46*       (2006.01)
(Continued)

(52) U.S. Cl.
CPC ........ *H04L 12/4641* (2013.01); *H04L 12/4633* (2013.01); *H04L 63/0227* (2013.01);
(Continued)

(58) Field of Classification Search
CPC ... H04L 69/167; H04L 69/16; H04L 12/4633; H04L 12/2818
USPC .......................... 709/227, 238, 217–219, 203
See application file for complete search history.

(56) References Cited

U.S. PATENT DOCUMENTS 6,118,784 A *   9/2000   Tsuchiya et al. ............... 370/401
6,507,577 B1 *  1/2003   Mauger et al. ................ 709/227
(Continued)

FOREIGN PATENT DOCUMENTS

JP    2001-274845    10/2001
JP    2002-077261    3/2002
(Continued)

OTHER PUBLICATIONS

Suzuki, N., Catlog deha Wakaranai Kinou ya Tokuchou wo Denju Network Kiki Daijiten, *Network World*, Nov. 1, 2003, 8(11), Japan, 134-139.
(Continued)

*Primary Examiner* — Philip B Tran
(74) *Attorney, Agent, or Firm* — Baker & Hostetler LLP

(57)    ABSTRACT

The purpose of the present invention is to provide an Internet connection system capable of performing bidirectional communications between a home network and the Internet by relatively simple means and enabling manufacturers of client-side home network appliances to find a unique added value.

In order to attain the above object, according to a first primary aspect of the present invention, there is provided a method for connecting a client device to a server, comprising the steps of: (a) notifying a relay device of an IP address of the server; (b) establishing a TCP/IP session by a tunneling connection between the relay device and the server using the notified IP address; and (c) based on information of the relay device or the client device, grouping by the server a plurality of relay devices or client devices for each of which a tunneling connection with the server is established.

27 Claims, 12 Drawing Sheets

(51) Int. Cl.
  *H04L 29/06* (2006.01)
  *H04L 12/28* (2006.01)
  *H04W 80/04* (2009.01)

(52) U.S. Cl.
  CPC ............ *H04L63/0272* (2013.01); *H04L 69/16*
   (2013.01); *H04L 69/167* (2013.01); *H04L*
   *12/2818* (2013.01); *H04L 12/2834* (2013.01);
   *H04W 80/04* (2013.01)
  USPC ........................... 709/227; 709/203; 709/238

(56) References Cited

U.S. PATENT DOCUMENTS

| | | | |
|---|---|---|---|
| 6,523,696 B1* | 2/2003 | Saito et al. | 709/223 |
| 6,772,226 B1* | 8/2004 | Bommareddy et al. | 709/250 |
| 7,353,280 B2* | 4/2008 | Chiles et al. | 709/228 |
| 2003/0009515 A1* | 1/2003 | Lee et al. | 709/202 |
| 2003/0018753 A1 | 1/2003 | Seki | |
| 2003/0037163 A1 | 2/2003 | Kitada et al. | |
| 2003/0048783 A1* | 3/2003 | Tateoka | 370/390 |
| 2003/0214955 A1 | 11/2003 | Kim | |

FOREIGN PATENT DOCUMENTS

| | | |
|---|---|---|
| JP | 2003-030072 | 1/2003 |
| JP | 2003-060675 | 2/2003 |
| JP | 2004-040723 | 2/2004 |
| JP | 2004-048260 | 2/2004 |
| JP | 2004-150681 | 5/2004 |
| WO | WO 01/71977 | 9/2001 |

OTHER PUBLICATIONS

Ando, K., PPP: Dial up deha Dotanbatakinousa ga Kousoku Tsushin no Omoni, Jan. 4, 1999, 285, 82-88, Nikkei Communications, Japan.
Ishida, T. et al., "Development of PPPoE Redirection Switch", Jul. 25, 2002, 102(256), 1-6 (English Language Abstract attached).
Kanou, H., "Firewall tono Renkei ni Hitokufuu Digital Shomei ha Honninkakunin to Heiyou", Nikkei Communications, Mar. 18, 2002, 198-201, Japan.
Ito, H., "Remote Setsuzoku de IP sec wo Daitai Ninshou System tono Renkei ni Shouki", Tele Communication, Dec. 25, 2003, 21(1), 80-84, Japan.
Nobori, D., SoftEther de Network Jiyuujizai, *Linux Magazine*, May 2004, 6(5), 48-53.
European Patent Application No. 05741637.2: Supplementary Search Report, dated Nov. 5, 2010, 3 pages.

* cited by examiner

Domain Name (Home Network Name/Relay Device Name):

| Terminal Name | Owner | State | Equipment Type | Model Number | |
|---|---|---|---|---|---|
| 1 | Father | Power ON | Video | XX1 | Operation Screen |
| 2 | Father | Power ON | TV | YY2 | Operation Screen |
| 3 | Father | Power OFF | PC | SS3 | Operation Screen |
| 4 | Father | Power ON | Camera | FF4 | Operation Screen |

SERVER FOR ROUTING CONNECTION TO CLIENT DEVICE

CROSS REFERENCE TO RELATED APPLICATIONS

The present application claims priority under Article 4 of the Paris Convention (and corresponding stipulations of other countries) based upon Japanese patent application No. 2004-150681, filed on May 20, 2004. The entire disclosure of the aforesaid applications is incorporated herein by reference.

FIELD OF THE INVENTION

This invention relates to a method for connecting a client device and a server, and to the server and network-enabled home appliances used in this method which enable bi-directional communications among terminals belonging to different home networks via Internet in a highly secure manner by relatively simple means under a current infrastructure environment widely employing the IPv4 (Internet Protocol version 4).

BACKGROUND OF THE INVENTION

In a service delivery environment through public networks centered around the Internet, values of all information are generally collected on a server side rather than a client side.

In other words, each client (terminal device) is basically a mere viewer browsing information on the Internet. Each client issues various information requests to the Internet, which in return may obtain information of such a client. It means that all information is collected on the Internet and it only offers formulaic information unidirectionally. For this reason, it is difficult for manufacturers of client terminal devices to create an added value.

In order to change such a circumstance, the server-client relationship must be reversed by inverting the access direction. That is, for a home network connected to the Internet, an environment must be created in which an access to the home network is initiated from the Internet and a service from the home network to the Internet is provided.

To achieve this, each device connected to a home network must be uniquely identifiable from an internetwork, and intra-home routing and security problems must be solved. One of the technologies to address this issue is the IPv6 (Internet Protocol version 6).

However, taking account of the environment surrounding the current Japanese carriers and Internet service providers, it may require considerable time until IPv6 becomes widely used. For example, the currently used IPv4 needs at least 2 to 3 years for depreciation and IPv6 service is offered on a test basis only.

In order to immediately achieve an IPv6-enabled network, manufacturers must expand their business to ISP level services, which is very costly and unrealistic for most of them. With this broad range of home network environments with their connection mechanisms widely varying depending on the carrier and ISP, there is a need for a mechanism which absorbs all these differences to realize the IPv6 environment by a standardized approach.

One of the prior art literatures related to the above circumstances is Japanese Patent Application 2001-274845 Publication, although it does not deny the novelty and inventive step of an invention according to the present application.

In the conventional IPv4 environment, the following problems arise in order to achieve bidirectional accesses between the home network and the Internet which would be realized by IPv6 networks.

In the current IPv4 environment, for example, when installing a network home appliance at home, it should be connected to a router connected to the Internet through the home network. For this reason, an IP address of the network home appliance becomes a private address and cannot be accessed from non-home network.

Thus an access to the network home appliance has been conventionally achieved by employing a dedicated router capable of controlling the network home appliance, or by first accumulating information for controlling the home network appliance at a data center provided on the Internet and next retrieving the information by performing polling from the network home appliance.

However, when using the dedicated router, the system's versatility decreases and cost increases. When retrieving the control information by polling, accesses cannot be made real time and the network and server load increases.

Considering the above situation, the purpose of the present invention is to provide an Internet connection system capable of bidirectional communications between the home network and the Internet by relatively simple means, enabling manufacturers of client-side network home appliances to find a unique added value.

SUMMARY OF THE INVENTION

In order to attain the above object, according to a first principal aspect of the present invention, there is provided a method for connecting a client device and a server, implemented on an Internet connection system which comprises the client device, a relay device, and the server which is connected to the Internet network and which is also connected with the client device through the relay device and the Internet, comprising the steps of: (a) notifying the relay device of an IP address of the server; (b) establishing a TCP/IP session by a tunneling connection between the relay device and the server using the notified IP address; and (c) based on information from the relay device or the client device, grouping by the relay device or the server a plurality of relay devices or client devices for each of which a tunneling connection with the server is established, wherein the plurality of relay devices or client devices are assumed as connected to one virtual private network.

According to such a structure, all communications relating to a client device such as a network home appliance will be performed via the server on the Internet regardless of the carrier or ISP. Also by managing the relay devices and/or client devices in the same network group, this server will serve as a hub and allow a plurality of client devices at different locations to intercommunicate as devices on a virtual private network group. In addition, by assigning an IPv4 global address to the client device at the same time, all existing problems related to individual identification of the client device in the private network by the server on the Internet, intra-home routing and security can be solved, and extremely open, yet closed networks can be realized.

According to one embodiment of the present invention, the relay device is installed in respective client device.

According to another one embodiment, in the step (a), the relay device connects to a tunneling mediation server provided on the Internet, and receives the IP address of the server from the tunneling mediation server.

According to yet another one embodiment, the step (b) includes the steps of: (b-1) connecting to the server by the relay device using the assigned IP address of the server; (b-2) notifying, by the server, the relay device of the IP address of the relay device for establishing a TCP/IP session with tunneling; and (b-3) establishing a TCP/IP session with tunneling between the server and the relay device. In this case, the step (b-1) preferably includes the step of performing connection authentication for the relay device by the server; and the step (b-2) preferably includes the step of generating an IP address for the relay device depending on a result of the connection authentication.

According to still another one embodiment, the grouping of the step (c) is performed based on the IP address of the relay device or client device.

Furthermore, according to a second principal aspect of the present invention, there is provided a network-enabled home appliance, comprising: a control section for receiving a packet including a predetermined command, and controlling this network home appliance based on the command; a server address storage section for storing a global address of a server located on the Internet; a tunneling establishing section for establishing a tunneling connection between the network-enabled home appliance and the server based on the global address of the server; a group information storage section for receiving from the server information of other network home appliances belonging to the same group, and storing the information; and a packet processing device for capsulating/de-capsulating packets communicated with the server through the tunneling connection, and routing the packets to the control section or the other network home appliances. This network-enabled home appliance preferably comprises: a mediation server address storage section for storing an address of a tunneling mediation server located on the Internet; and a server address obtaining section for accessing the mediation server based on the mediation server address, and receiving an address of the server from the mediation server.

Additionally, according to a third principal aspect of the present invention, there is provided a server used by an Internet connection system, the Internet connection system comprising a client device, a relay device, and the server connected to the Internet network, the server also connected with the client device through the relay device and the Internet, comprising: a tunneling establishing section for establishing a tunneling connection with the relay device; and a terminal group management section for building a network group with other relay devices or client devices connected with this server by tunneling based on information from the client device or the relay device.

According to one embodiment of the present invention, this server further comprises a model identification section for determining if the client device and/or the relay device are/is of predetermined models, wherein the terminal group management section builds a network group to which client devices belong, wherein the client devices are of a predetermined model, based on the result from the model identification section.

According to yet another one embodiment of the present invention, this server further comprises a command conversion section for converting a command to be sent to the client device to a command in a predetermined format for controlling the client device based on the network group.

According to still another one embodiment of the present invention, the client device includes a peripheral device which is communicable with the relay device but unable to connect to the Internet by itself.

According to yet another one embodiment of the present invention, this server further comprises a state information obtaining section for obtaining at least one of, or a plurality of: an operation state, a usage state and location information of the client device and/or relay device.

Other characteristics and marked effects of the present invention will be appreciated to those skilled in the art upon referring to the following detailed description of the preferred embodiments and the accompanying drawings.

DETAILED DESCRIPTION OF THE PREFERRED EMBODIMENTS

An embodiment of the present invention will be described below in accordance with accompanying drawings.

Figure 1:
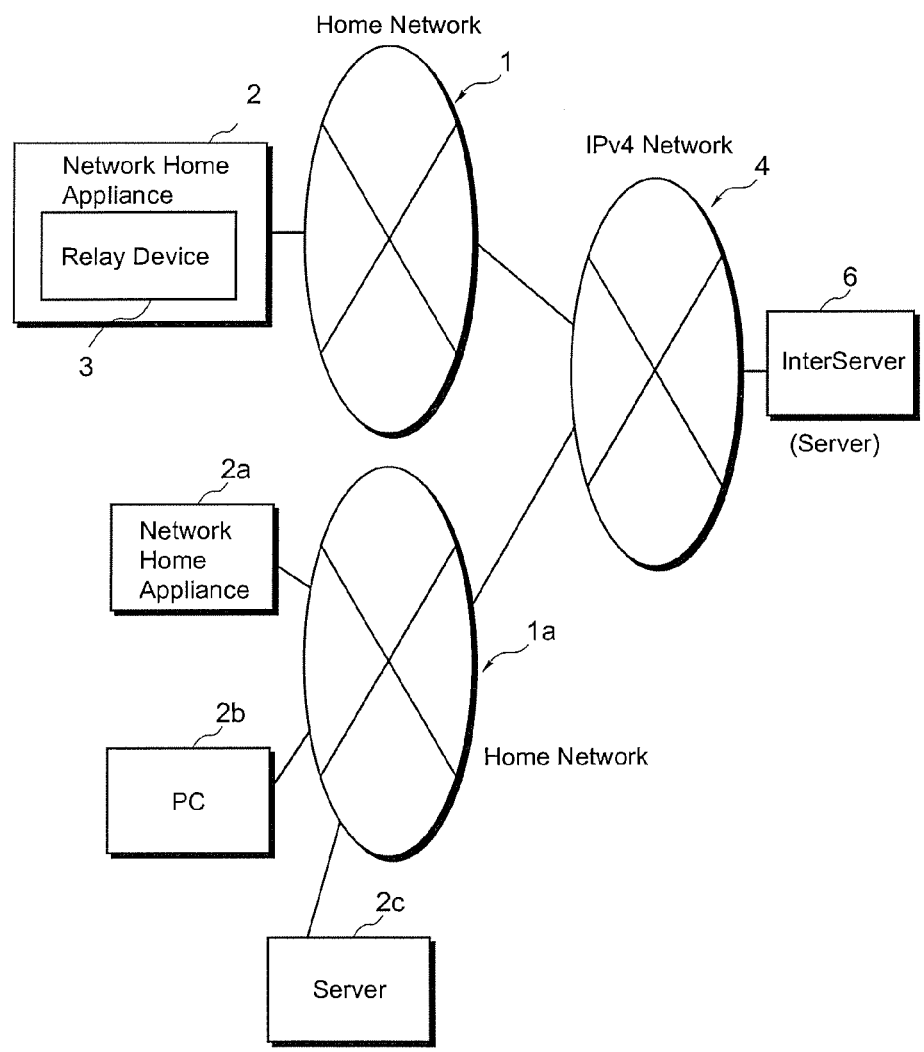
FIG. 1 is a diagram showing an example of network structure according to one embodiment of the present invention.

FIG. 1 is a diagram showing an example of network structure according to this embodiment.

Indicated with a reference numeral 1 in this figure is a home network defined by a connection with various types of client network home appliance 2 (hereafter, referred to as a "network home appliance") communicating with IPv4 (a first communication protocol). This home network 1 is, for example, composed of a LAN implemented in each home. Also a relay device 3 of this invention is installed in each of the network home appliance 2.

This home network 1 is connected to an Internet network 4 via a communication carrier/ISP. In this Internet network 4, communications are performed using IPv4 (a second communication protocol).

Connected to this Internet network 4 is an InterServer 6 (a "server" of this invention) for controlling communications of the network home appliance 2 on the home network 1. As will be described in greater detail herein below, this InterServer 6 has functions for mediating a connection between the network home appliance 2 and any network home appliance 2a (including a personal computer, personal computer 2b and server 2c on the Internet network 4 or other home/global networks 1a.

Here, the relay device 3 and the InterServer 6 are intended to be manufactured by the same manufacturer or under a unified standard, and are designed to interface with each other. The relay device 3 is provided with an private/global address from the InterServer 6 with IPv4 as described below so that a TCP/IP session with tunneling connection may be established at the InterServer 6 to enable communications regardless of its carrier and ISP. Also the network home appliance 2 connected to the home network 1 is also intended to be manufactured by the same manufacturer as that of the relay device 3 or the like, or manufactured under a unified standard, and for example (but not limited to), an IP address of the relay device 3 is uniquely generated based on the model of this network home appliance 2 and other information.

Note that the network home appliance 2 may be a home appliance such as a VCR or a TV, which itself cannot connect to the Internet. In this case, the relay device 3 and the network home appliance 2 are connected through a predetermined communication interface (IEEE1394) and a virtual IP address may be assigned to an ID for each home appliance 2 (unique ID).

Figure 2:
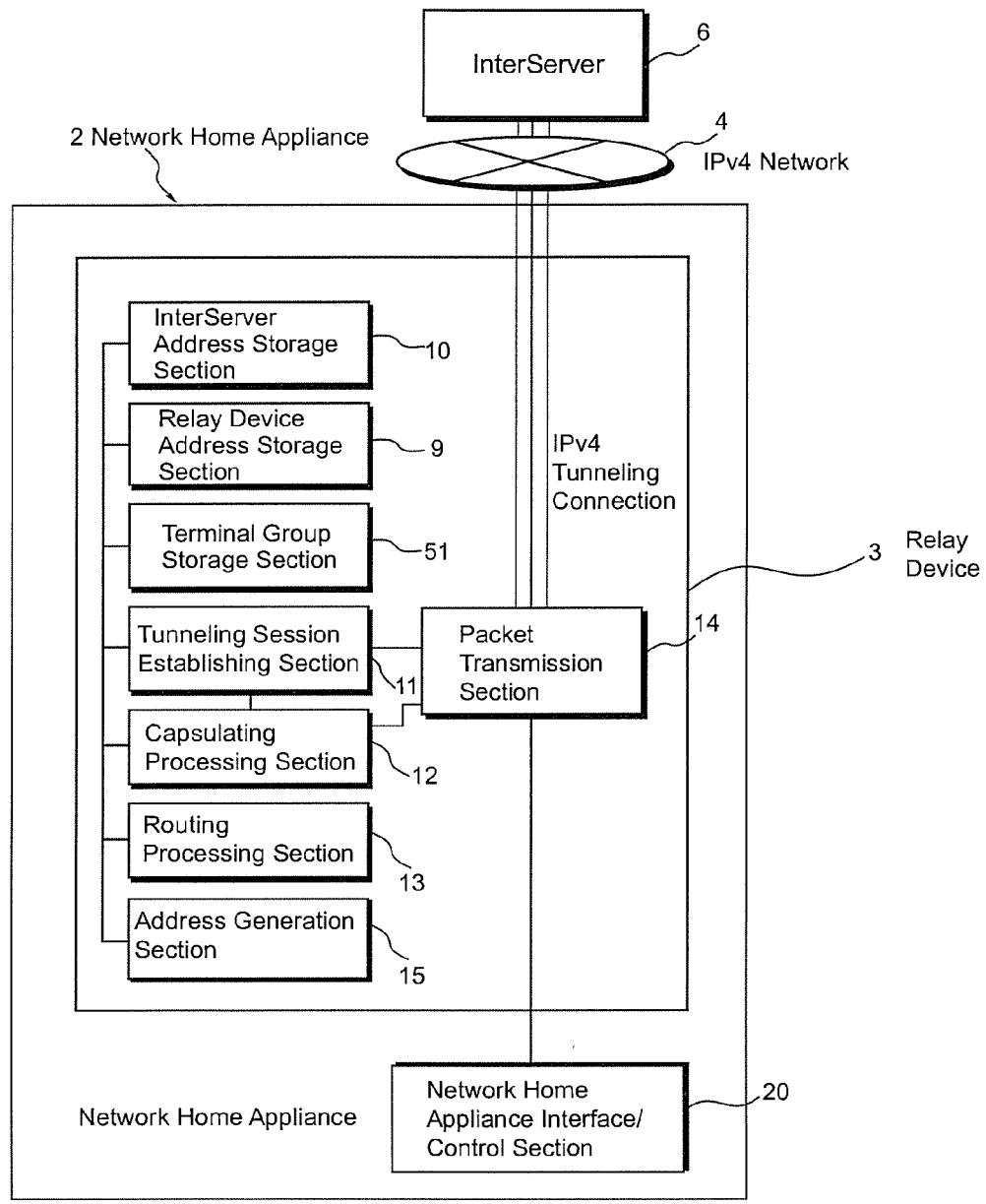
FIG. 2 is a schematic structural view showing an example of a relay device according to one embodiment of the present invention.

FIG. 2 is a schematic structural view showing the network home appliance 2 and the relay device 3.

This relay device 3 has a server address storage section 10 for storing a global address of the InterServer 6 with IPv4; a relay device address storage section 9 for storing a private address with IPv4 assigned to this relay device 3; a terminal group storage section 51 for storing a "terminal group" which is a group of terminals assigned by the InterServer 6 in order to configure a virtual private network; a tunneling session establishing section 11 for establishing a tunneling connection with the InterServer 6 based on the InterServer 6's address; a capsulating processing section 12 for capsulating/decapsulating IPv4/IPv6 packets with IPv4 and performing tunneling transmissions between the InterServer 6 and a network home appliance interface/control section 20; a routing processing section 13 for routing the decapsulated packets from the InterServer 6 to the network home appliance 2; and a packet transmission section 14 for transmitting the packets. Also this relay device 3 is provided with an address generation section 15 for purposes such as generating an address (MAC address and the like) for the network home appliance 2.

According to such a structure, packets to or from the network home appliance 2 can be transmitted via a tunnel established with IPv4 between the InterServer 6 and the relay device 3.

Figure 3A:
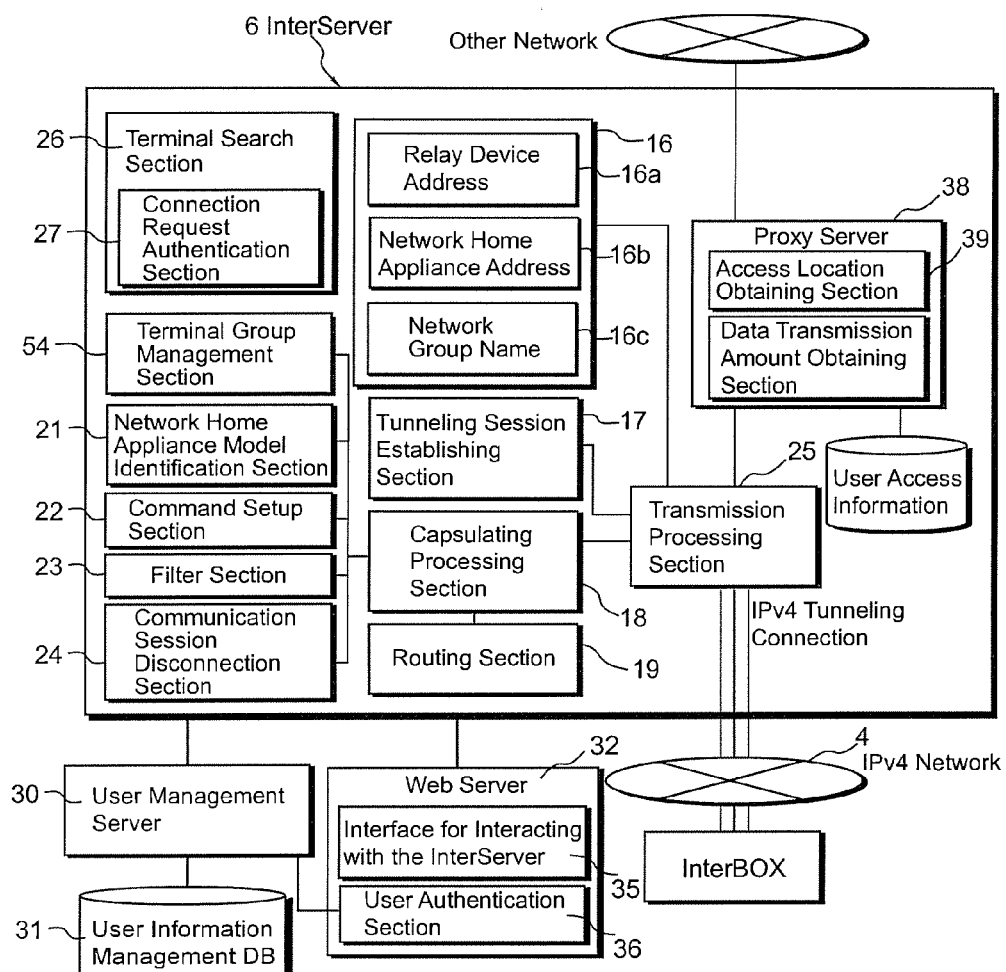
FIG. 3A is a schematic structural view showing an example of an InterServer according to one embodiment of the present invention.

FIG. 3A is a schematic structural view showing the InterServer 6.

This InterServer 6 has an address storage section 16 for associating and storing a private address 16a (information for identifying a tunneling session) of the relay device 3 with IPv4, a global address 16b of the client device with IPv4/IPv6 and a network group name 16c; a tunneling session establishing section 17 for establishing a tunneling connection with this relay device 3 based on the address of the relay device 3; a capsulating processing section 18 for capsulating/decapsulating IPv4/IPv6 packets using IPv4 to enable communications with the network home appliance 2; and a routing section 19 for routing communications between the network home appliance 2 and other terminals and servers.

This InterServer 6 also has a terminal group management section 54 for managing the work home appliance 2 (client device) in a group. This terminal group management section has a LAN switch function and a function for grouping the network home appliance depending on an IP address assigned to this network home appliance. Specifically, this terminal group management section 54 selects one appropriate group from a pre-configured plurality of groups so that the selected group includes the network home appliance. Thus, a virtual network can be constructed with this InterServer 6 as a hub regardless of a physical location of a terminal belonging to the same network group. It should be noted that this grouping may be performed depending on other attributes of the network home appliance, for example, the MAC address or protocol. This may be performed based on user authentication as discussed below.

Furthermore, this InterServer 6 has a model identification section 21 for determining a type of the network home appliance 2 based on the IPv4 address of this network home appliance 2 or the relay device 3; a command setup section 22 for converting a command to be sent to the network home appliance 2 to a predetermined command and setting it based on the result from the model identification section 21; a filter section 23 for filtering the tunnel-transmitted IPv4 packets using predetermined rules; and a communication session disconnection section 24 for disconnecting a communication session in predetermined cases. Packet transmissions are performed by a transmission processing section 25.

Further, this InterServer 6 is connected to a user management server 30. As discussed in greater detail below, this user management server 30 manages user information for each of the relay device 3 and network home appliance 2, and has a user information management DB 31 for storing member information of each user such as ID, password and billing information as well as machine model and network information (IP address and network group information) and the like.

Figure 3B:
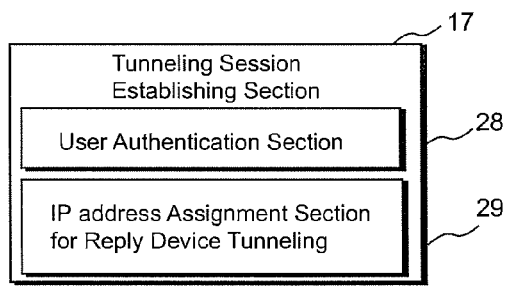
FIG. 3B is a diagram showing an example of a tunneling session establishing section according to one embodiment of the present invention.

Information in the user management DB 31 is used when the tunneling session establishing section 17 establishes a tunneling session. That is, as shown in FIG. 3B, this tunneling session establishing section 17 is further provided with a user authentication section 28 for authenticating each user based on the user information; and a relay device IP address assignment section 29 for assigning an IPv4 private address to the relay device 3 to establish a tunneling session. In the case of IPv4/IPv6, any address scheme may be used for an IP address assigned to each relay device such as a private or global address. This IP address may be generated according to a predetermined rule depending on the above user, machine model and network information, or according to a user specification. It should be noted that a method for generating an address for the relay device 3 is not limited to the above description.

Moreover, this InterServer 6 has a Web server 32, which has been presented to the public on the Internet 4 (IPv4 network), and permits receiving a request from the user of the relay device 3 and the network home appliance 2 and allowing the user to configure various settings. For example, at least part of filtering rules applied to the filter section 23 may be changed by the user via this Web server 32 accordingly. Note that this Web server 32 may be accessed through the relay device 3 and the InterServer 6 or through the Internet 4 without these relay device 3 and InterServer 6.

Figure 4:
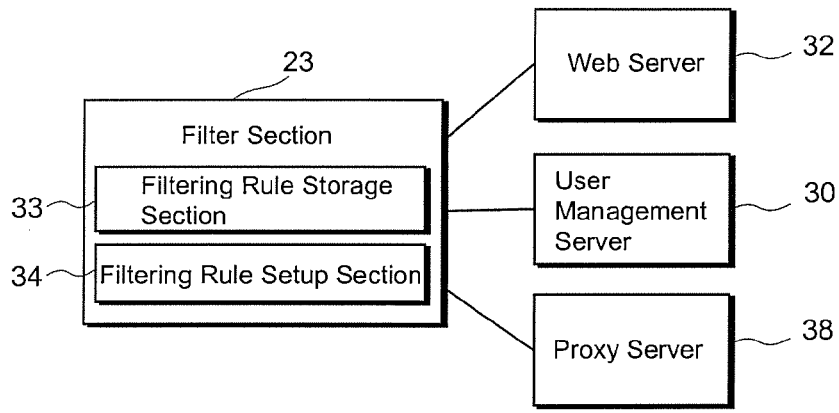
FIG. 4 is a diagram showing schematic structure of a filter section.

The filter section 23 has a filtering rule storage section 33 and a filtering rule setup section 34 as shown in FIG. 4. The filtering rule storage section 33 and filtering rule setup section 34 are connected to the Web server 32, which has been presented to the public on the Internet and installed with an interface generation section 35 for interacting with the InterServer, as shown in FIG. 3A. A user connected to this Web server 32 can enter or change the filtering rules by displaying an interface generated by the interface generation section 35 on the user's own terminal. Here, possible configurable filtering rules include, for example, ones related to security.

Possible security filtering rules are to: (1) deny all accesses to the home network from outside; (2) deny all accesses to the home network from outside except from pre-accepted servers (Web sites) and networks; and (3) allow all accesses to the home network from outside without restriction. In this case, the filtering method may be configured so as to deny all accesses or to allow only specific ports.

In this case, accesses from the home network 1 to outside may be restricted, for example, to prevent children from accessing harmful contents and to generally prevent users from accessing fraudulent Web sites (for example, with traps).

Note that these filtering rules may be configured after ID and password authentication by a user authentication section 36, which is provided in the Web server 32 and connectable to the user management server 30.

The filtering rule setup section 34, which configures the filtering rules based on the user entry as described above, also has a function to generate the filtering rules automatically based on the member information (such as billing and terminal model information) stored in the user management server 30 without depending on the user entry. For example, the filtering rules may be configured as a gateway to, for example, allow no connections or allow access only to specific servers depending on the user's attributes and membership dues payment status.

These filtering rules as a gateway may be used to control vendors which provide a fee-based business via the InterServer 6. For example, as shown in FIG. 3A, the InterServer 6 may be provided with a proxy server 38 and the user's access destinations may be managed in a DB 39 so that the user may only connect to access destinations set in the filtering rule setup section 34. In this case, it is preferred to have the user management DB 31 manage the user ID and password as well as a service (server) the user is using and terms of the service (server) contract, and to implement a function for controlling transactions according to the terms. For specific vendors, only samples, but not actual contents, may be displayed to a user who has not completed a registration procedure.

Figure 5:
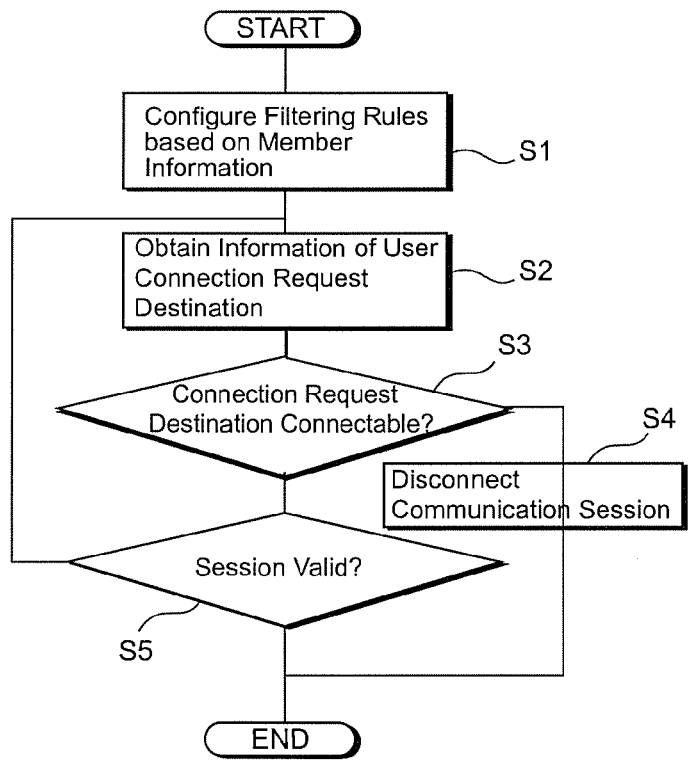
FIG. 5 is a flowchart showing processing at the filter section.

FIG. 5 is a flowchart showing processing at the filter section 23. First, when a tunneling session is started, this filter section 23 configures the filtering rules based on the member information received from the user management server 30 (step S1). Next it receives information of a destination to which the user requested a connection (for example, an Web site address) from the proxy server 38 (step S2). Then the filter section 23 applies the connection destination information to the filtering rules, determines whether or not the access should be permitted (step S3), and disconnects the communication session with the communication session disconnection section 24 if the connection is not permitted (step S4). If the connection is permitted, the filter section 23 determines if the session is still valid (step S5) and if so, repeats processing of the steps S2-S5. If the session is no longer valid, the processing is terminated.

Also the proxy server 38 may be configured so as to measure the data communication traffic and deny access from a user who has not paid his/her fees. In this case, the vendor may be informed of the users' ID's, but not their passwords or IP addresses. Thus, the user should simply manage a pair of ID and password for the InterServer 6. It is appropriate to check the ID as a key each time for system consistency since the IP address may be changed for the user's convenience or other reasons, and since it can also eliminate a risk of the vendor's illegal access using the user data.

Enforcement of the filtering rules, and disconnection and connection of a communication session based on these rules are performed by the communication session disconnection section 24. Incidentally, filtering methods, gateway methods, and other methods using the configured filtering rules are publicly known and therefore their descriptions are omitted herein.

The InterServer 6 has a search section 26 for the network home appliance, which is also a terminal (FIG. 3A) for providing the user who does not know the address of the network home appliance 2 with an ability to find this network home appliance 2. This search section 26 searches and identifies a desired network home appliance 2 based on user-specified information, for example, the operation states of the network home appliance 2 and the network.

Figure 6:
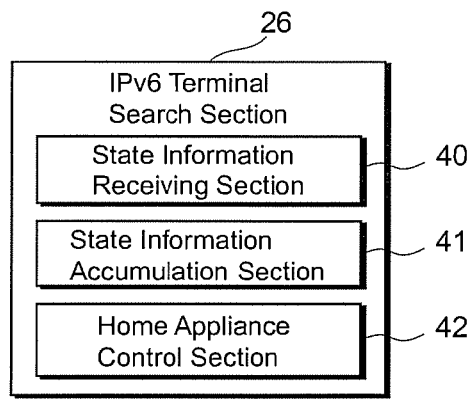
FIG. 6 is a diagram showing schematic structure of a network home appliance search section.

To do this, this search section 26 has a state information receiving section 40 for receiving state information such as the operation states of the network home appliance 2 and the network; a state information accumulation section 41 for storing the received state information in association with IP addresses of the network home appliance and relay device 3, and the network group name; and a network home appliance control section 42, as shown in FIG. 6.

The state information receiving section 40 receives state information of each network home appliance 2 for each tunneling domain (the home network or the relay device 3) which accommodates the network home appliance 2. This state information receiving section 40 may receive the state information by querying the state for each domain either at a predetermined interval or on receipt of a reference request for each domain. In the former method, for example, a query is performed every minute at each relay device registered in the relay device address storage section 16a regarding a power ON/OFF state of each terminal 2 or network home appliance.

The state information accumulation section 41 stores the state information of the respective network home appliance 2 in association with this network home appliance 2 and the relay device 3. Here, the obtained state information includes at least one of or a plurality of: the operation state, a usage state, location information, property information, information maintained at a node (the relay device 3 or the network home appliance 2), and information effective for identifying the node.

The operation information includes at least one of, or a plurality of: a power state, a network connection state and a communication state. The usage state includes at least one of, or a plurality of: user information, operation time information and load information. The location information includes at least one of or a plurality of: geographical location and coordinate information, a zip code, a room number and the like. The property information includes at least one of, or a plurality of: the type, function, shape, color, device information, software information and administrator information of the node.

Additionally the machine model determined by the model identification section 21 is individually stored as state information. The state information receiving section 40 is configured so that it can identify information obtainable from the network home appliance 2 based on this model information, and obtain required information in a format adapted to the obtainable information.

The search section 26 is provided with a connection request authentication section 27 for connecting to the user management server 30 to authenticate the user performing the search or issuing the connection request and permitting the search or connection request. For the user's home network (relay device 3), for example, search within and connection to the home network is allowed to only specific users permitted to connect to it. If this connection request authentication section 27 gives a positive result, the search section 26 accesses the state information accumulation section 41 and the address storage section 16, and searches for an address of a desired terminal 2 (identifies the relay device 3).

Figure 7:
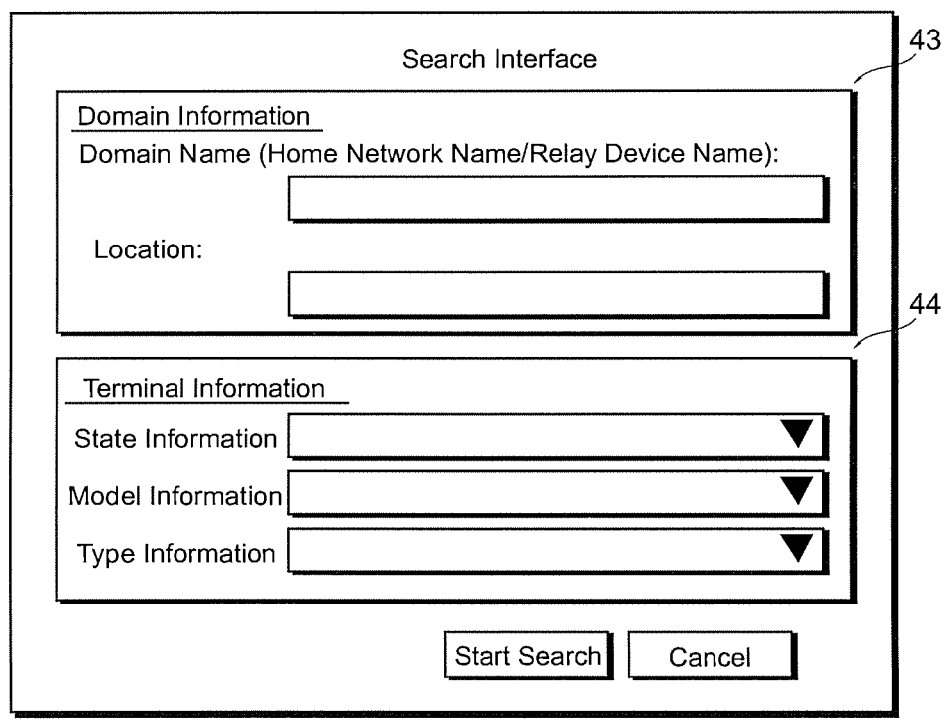
FIG. 7 is a diagram showing an example of a search screen.
Figures 8, 9:
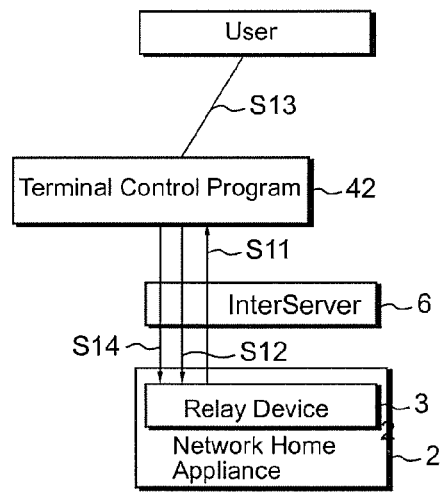
FIG. 8 is a diagram showing an example of a search result list display for the relay device.
FIG. 9 is a diagram showing a control concept of a network home appliance control section.

For example, when the user searches for the relay device 3 of the user's own home network from the external system using a personal computer, the search results may be displayed as a list of all network home appliances 2 connected to the relay device 3 together with the respective state of the network home appliances 2. FIG. 7 is an example of a search screen and FIG. 8 is an example of a list display of search results for the relay device 3/home network 1. In the example of a search interface shown in FIG. 7, there are provided entry fields 43 for searching the relay device 3 and entry fields 44 for searching the network home appliance 2, and this search interface is programmed to allow searching from either the entry fields 43 or the entry fields 44.

In the example of a search result list display in FIG. 8, all terminals 2 connected to the relay device 3 are listed with their respective owner, state, type and model information. Further by pressing an operation screen display button indicated with 45 in the figure, the network home appliance control section 42 is activated and an operation screen (not shown) is displayed according to the type and model of the terminal 2.

FIG. 9 is a conceptual diagram showing the control by the terminal control section 42.

First, the network home appliance 2 notifies its operation state in response to a request from the state information receiving section 40 (step S11) while the relay device 3 is connected to the InterServer 6 through a tunneling session. At this point, it may be configured so that the operation state cannot be obtained unless the network home appliance 2 logs in the control section 42. The operation state is obtained at a regular interval and accumulated and updated in the state information accumulation section 41 (step S12).

Next the user of the network home appliance 2 logs in from the outside using the user ID and password, and identifies a terminal to control from the list as described above to activate the control section 42 (step S13). This control section 42 processes all instructions on the server side and sends an appropriate command to the terminal device to control it.

Also the user may select a terminal name from the list to thereby routed and connect to the selected network home appliance 2. Further, the user may enter a specific state as a search condition and, if a terminal with that condition is found, may connect to the terminal directly. Note that the connection to the terminal is made after a tunneling connection is established even when the user searches for the terminal from outside of the home network via the Web server without using the tunneling connection through the InterServer 6.

Here, the above "tunneling" refers to technologies for connecting between IPv4 or IPv6 networks (routers) via an IPv4 network, and herein more specifically refers to technologies for tunneling to terminate multiple devices which belong to different networks with a VPN (virtual private network). In this embodiment, IPv4 packets transmitted among devices are capsulated with IPv4.

In practice, the each of the components 10-42 of the relay device 3 and InterServer 6 is composed of a certain area reserved on a hard disk in a computer system; computer software programs installed in the area; and a CPU, a RAM and peripheral devices such as other input and output devices for controlling the hard disks to read the programs. Also as described above, the network home appliance includes general purpose personal computers and in this case, each component of the present invention is installed as a service program and a virtual Ethernet device.

Additionally the relay device 3 is preferably composed of one computer system including each network home appliance 2, but the InterServer 6 is preferably composed of a plurality of computer systems connected to one another for load sharing. For example, the search section 26 for terminals for managing the states of the relay device 3, network home appliance 2 and home network is preferably composed of a server with a dedicated transmission interface and a control section. This is due to an immense number of sessions predicted for managing ON/OFF and other states of each device which will require load sharing. Also when one InterServer 6 processes relay devices and network home appliances from different manufacturers, there may be provided a plurality of the capsulating processing sections 18, command setup sections 22, filter sections 23 and the like.

Hereinafter, operations of the relay device 3 and InterServer 6 will be described below in accordance with communication examples of FIG. 10 and later.

Figure 10:
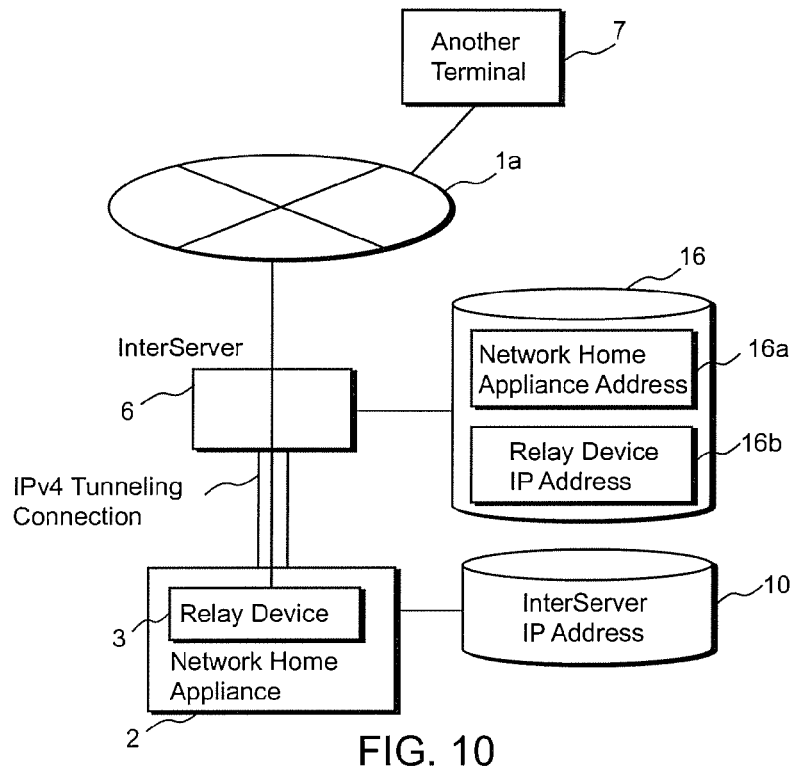
FIG. 10 is a function diagram showing a communication example in the present embodiment.

FIG. 10 is showing a communication via the InterServer 6 between a network home appliance 2 of a home network connected with a relay device 3, and another terminal with no relay device 3 provided.

This diagram shows a communication session with the relay device 3 established within a tunneling connection by the tunneling session establishing sections 17 and 11 based on an address of the InterServer 6, an IP address assigned to the relay device 3 and an address of the network home appliance 2.

Once the tunneling communication session is established, packets to the network home appliance 2 are transmitted after being capsulated in IPv4 packets for the relay device 3 by the capsulating processing section 18. In the relay device 3, the capsulating processing section 12 decapsulates those packets while the routing processing section 13 processes routing to the network home appliance 2 based on its address included in the packets. As described above, a connection to a network home appliance 2 in a home network at home, for example, may be established by an activation from an external IPv6 server 7.

If the network home appliance 2 is, for example, a home security camera, this camera may be activated and controlled through the InterServer 6 and the relay device 3 even when the home owner is outside of home by connecting the home owner's PDA and the like to a nearest IPv6 network.

Also in this example, the model identification section 21 for network home appliance, the command setup section 22 and the filter section 23 provided in the InterServer 6 are configured to function according to the model of the network home appliance 2.

The model identification section 21 is configured to determine the model of the network home appliance 2 and a network environment based on, for example, the address of the relay device 3 or network home appliance 2 (address itself or information associated with the address). In this embodiment, the network home appliance 2, relay device 3 and InterServer 6 are assumed to be produced by the same manufacturer or under a unified standard, wherein the model type or the network environment may be easily determined from the IP address assigned to (or generated for) the network home appliance 2 or the relay device 3 connected with this network home appliance 2 by presetting a certain set of rules to this IP address.

When a special command is required to control this network home appliance 2, the command setup section 22 coverts a command included in the communication from the IPv6 server 7 to a command for the determined model for configuration. For example, a predetermined command may be generated from a message described in the HTML language. Alternatively, an instruction from one server 7 may be converted to commands for a plurality of network home appliances 2.

The filter section 23 further has a function for filtering packets passing through this InterServer 6 based on predetermined rules. These filtering rules may be, for example, configured at a connection destination relay device 3, each network home appliance 2 or each network. It should be mentioned that the communication session disconnection section is configured to disconnect a communication session if the model identification section 21 does not recognize any of the predetermined models or network environments, or if the filter section 23 returns a negative result. In addition, if a connection destination network home appliance cannot be connected because its power is OFF and the like, but if there is an alternative IPv6 device connected to the same relay device, communication sessions may still be routed to the alternative network home appliance based on its model or type information.

Figure 11:
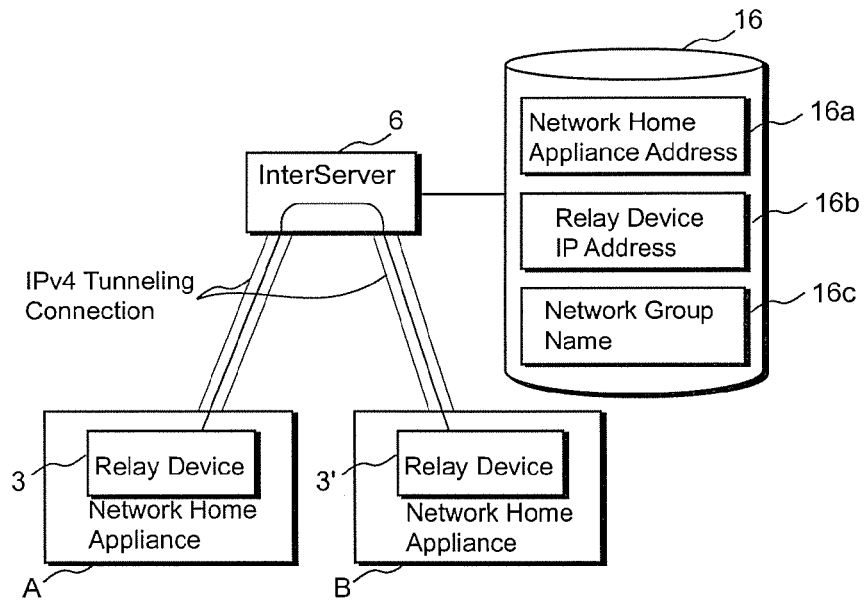
FIG. 11 is a function diagram showing another communication example in the present embodiment.

FIG. 11 is an example of a interconnection via the InterServer 6 between IPv6 home networks which have relay devices 3 and 3', respectively. In this example, although networks connected with network home appliances A and B, respectively, are physically different networks, the network home appliances A and B are regarded as logically connected to an identical network by grouping them into the same network group.

In order to group the network home appliances A and B in this case, a certain rule is applied to addresses (IP addresses) assigned to these network home appliances, or the same network group name is given to them in advance. In this manner, when the network home appliances connect to the InterServer 6 by tunneling respectively, the terminal group management section 54 associates these network home appliances with an identical group based on the addresses or network group name. One home appliance's login into the group will be notified to the other home appliance and this other home appliance will be permitted to access the one home appliance.

Accordingly, the two network home appliances 2 may communicate with each other through the InterServer 6.

Note that this grouping may be performed based on the user authentication by the connection request authentication section 27. Also a plurality of home appliances may be assigned to an identical network group based on other information, for example, the fact that they have the same model or communication protocol.

According to the above structure, all communications related to the network home appliance 2 are performed through the InterServer 6 regardless of their carriers and ISP's, enabling an owner of the InterServer 6 to freely configure and control the network home appliance 2 and the server 7 on their home or workplace network. Thus, all existing problems related to individual identification of the network home appliance 2 in the private network by the server on the Internet, intra-home routing and security can be solved, and extremely open, yet closed networks can be realized.

The owner of this InterServer 6 is typically assumed to be a manufacturer of the network home appliance 2. Therefore, this manufacturer may create an added value utilizing the Internet by preparing its own IPv6 device lineup compatible with the InterServer 6.

Especially, according to the technology allowing mutual accesses between terminals by the above grouping, the InterServer 6 serves as a hub on the Internet, thereby permitting to build a high security VPN among terminals belonging to an identical network group Next, sign-up of the network home appliance 2 will be described below in accordance with FIG. 12.

Although the IP address of the network home appliance 2 is received from the relay device 3 side in the above description, there are a variety of other possible methods in practice. Also the manufacturer and/or owner of the InterServer 6 may be interested in obtaining information on the owner (user) of the network home appliance 2. As described above, the address of the network home appliance 2 may in some case be: written into the RAM or the like of the network home appliance 2 as a factory default fixed IPv6 address; or determined according to an IPv6 prefix of the connecting relay device 3.

Figure 12:
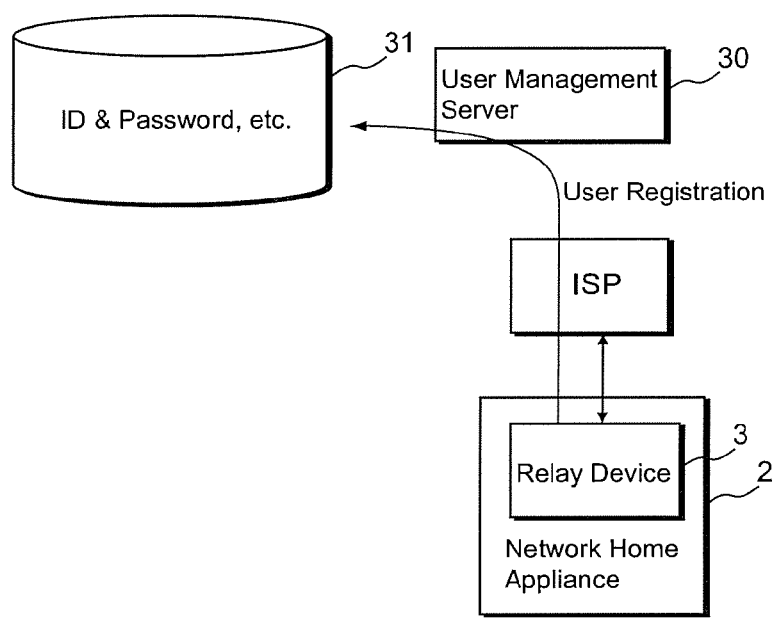
FIG. 12 is a diagram showing a setup example of the relay device or a network home appliance.

Therefore in this embodiment, as shown in FIG. 12 for example, users of the network home appliance 2 or relay device 3 should first connect to the user management server 30 to perform user registration. This user registration may be performed using the network home appliance 2 through the relay device 3, or using an IPv4-communication-enabled device of an existing personal computer or the like. Here, the case using the network home appliance 2 and relay device 3 will be described. Also another case will be discussed below in which the network home appliance 2 is a terminal incapable of establishing a network connection by itself, and the address of the network home appliance 2 is generated by the relay device 3 as a virtual address using a MAC address of each network home appliance 2.

In this case, when the user first connects the network home appliance to the relay device 3, this relay device 3 connects to the user management server 30 via the ISP/carrier. Thus, information or the like required for the tunneling connection from the relay device 3 to the InterServer 6 is passed to the user management server 30. The user also passes the user management server 30 via this relay device 3, information on the user, identification of the relay device 3 or network home appliance 2, the model of the network home appliance 2, the network 1, billing and the like. In the present example, an ID and a password are issued to each of the relay device 3 or user and registered in the user management database 31 in association with the relay device 3 or user information. Note that information required for the registration is not limited to the above and other information may be required, or if the password, billing information and the like are not needed, they may not be required for registration.

The user management server 30 described above may be connected to the InterServer 6 or may be independently provided on the Internet.

Figure 13:
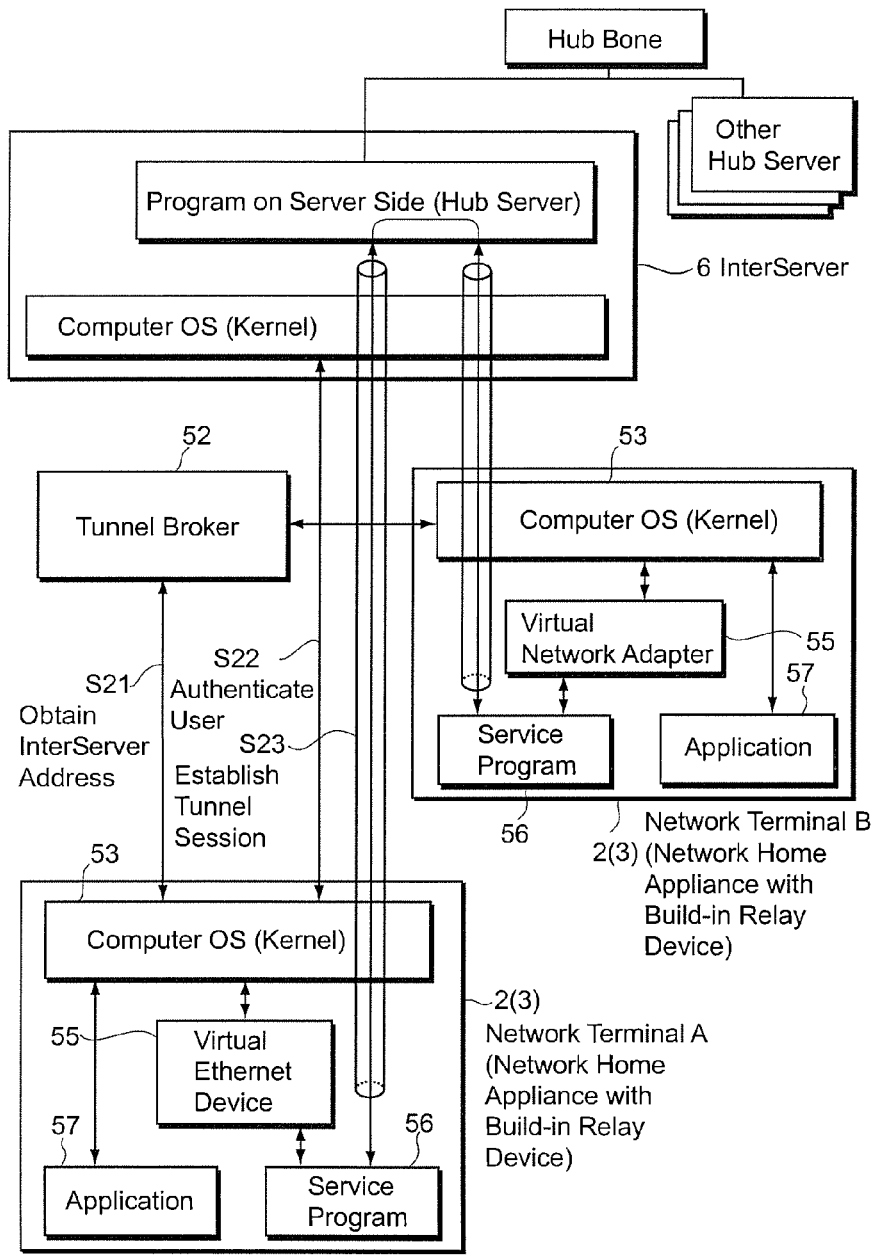
FIG. 13 is a diagram showing a tunneling connection example between the relay device and the InterServer.

FIG. 13 and later show an embodiment of a tunneling connection and a specific method for establishing a communication session within the tunneling connection. Each of the reference numerals/symbols, S21 and others in this figure corresponds to each of the following steps, respectively.

Although the network home appliance (relay device 3) stores the IPv4 address of the InterServer 6 in the embodiment described above, this address may be stored in the RAM by the manufacturer as a factory default, or received from another server or the like (including a tunneling mediation server) and configured at the time of actual tunneling connection. The former may be employed if there is a single InterServer 6 but the latter may be more efficient if there are a plurality of InterServers 6.

This diagram is an example of the latter and a tunnel broker 52 is provided accordingly. In this case, an IPv4 global address of this tunnel broker is preconfigured in a tunnel broker address storage section of the relay device 3. Also it is assumed that the relay device 3 is preconfigured with the ID and password (if required) described above.

Also in this FIG. 13, for the convenience of the description, the network home appliances A and B are shown as a computer operating system (OS) 53 such as Microsoft Windows (R, same below), an application 57 for network home appliance communications, a virtual network device 55, and a service program 56 for communications. When comparing this structure with one in FIG. 2, the application 54 and the network home appliance interface/control section 20, the virtual network device and the packet transmission section 14, the service program and the other structures (9-13, 15, 51 and the like) correspond, respectively. Here, the function of the routing processing section 13 in FIG. 2 varies depending on the operating system of the network home appliance 2 as discussed below, a case in which the OS is Microsoft Windows will be described first in the following.

In this case, the relay device 3 first connects to the tunnel broker 52. This tunnel broker 52 selects an InterServer 6 as a tunnel connection destination from an address database 53, and notifies the relay device 3 of an IPv4 address of this InterServer 6 (step S21). In this manner, the relay device 3 may identify the InterServer 6, and after the user authentication (step S22), the relay device 3 may establish the tunneling session and perform a communication using MAC and IP addresses received from the InterServer 6 (step S23).

In other words, once the relay device 3 connects with the InterServer 6, the authentication is performed to establish the connection and then the InterServer 6 assigns the MAC and IP addresses for a specific virtual private network for the relay device (these MAC and IP addresses may also be assigned by the mediation server). Note that a program of the InterServer 6 appears as one hub when seen from the relay device. The InterServer 6 is configured so as to assign a hub for each group and this assignment is called "grouping" in the present invention. It should be mentioned that when there are a plurality of InterServers 6, it is possible that network terminals which should belong to the same virtual private network are connected to different InterServers 6 but in this case, these connections are preferably routed by a hub bone server for managing a grouped a plurality of InterServers 6 or a plurality of server programs (hub server).

With regard to the MAC address, this embodiment uses two pseudo MAC addresses. That is, although one unique MAC address should be normally assigned to each piece of hardware, the Windows system has a software restriction by which an identical MAC address is assigned to virtual Ethernet devices of all relay devices (Internet home appliances). In this embodiment for example, 02:fb:dc:00:03:00 is assigned to virtual Ethernet devices of all relay devices (Internet home appliances). Since this address is fixed, this is referred to as "fixed MAC address" hereinafter.

In Ethernet, a communication destination party is identified with source and destination MAC addresses of the packet and therefore, successful communication cannot be achieved if the destination MAC address is unknown or if a plurality of terminals have an identical MAC address. This is also the case when using virtual Ethernet devices. Therefore, communications are impossible if the identical "fixed MAC address" is assigned to all relay devices as discussed above.

In order to solve this problem, the MAC address is manipulated in the address generation section 15 in this embodiment (FIG. 2). In other words, since all packets in the virtual network flow through the service program 56, it rewrites the MAC address on the packet as desired to thereby ensure MAC address uniqueness. This rewritten MAC address is notified by the InterServer 6 upon the user authentication and maintained in the relay device address storage section 9 as described above. It means that in this embodiment, there are two MAC addresses: the fixed MAC address which the virtual Ethernet device 55 has (identical for all network home appliances 2), and the rewritten unique MAC addresses.

Furthermore, a DHCP request packet is not sent to the InterServer 6 for the assignment of the client IP address (e.g., 10.10.0.1); the service program 56 receives the client IP address as mere data, stores it in the address storage section 9 and opens a driver of the virtual Ethernet device 55. Here, if Windows DHCP client function is enabled, the kernel generates a DHCP request packet for the virtual Ethernet device. As previously mentioned, the IP address of the virtual Ethernet device is already received upon the above user authentication. Therefore, this DHCP request packet does not reach the InterServer 6, and the service program 56 (routing processing section 13) retrieves the IP address stored in the address storage section 9 and generates a DHCP response packet as a response.

Next, address manipulation during communication will be described below.

In this embodiment, the InterServer 6 acts as network hub to perform routing for the network home appliances 2 (relay device 3) which belong to the same virtual private network group. In this case, since a communication between the network home appliances 2 is performed on the layer 2 (routing by MAC address), the MAC address of the communication destination network home appliance 2 will be required. In this embodiment, since all client network interfaces are implemented in the form of virtual Ethernet device, if there is no MAC address in an ARP table of the OS, this OS generates an ARP request packet and broadcasts it on the network.

However, since the communication cannot be performed at this point, the service program 56 rewrites the MAC address for the ARP packet retrieved from the virtual Ethernet device 55 in this embodiment. In other words, the address generation section 15 has the following two functions.

Function to read a Ethernet frame from the virtual Ethernet device, rewrite the source MAC address to the MAC address for the virtual private network, capsulate the ARP packet after the rewriting and send it to the InterServer (hub).

Function to receive the Ethernet packet data from the InterServer and rewrite the destination MAC address in the Ethernet packet to the MAC address of the virtual Ethernet device.

Figure 14:
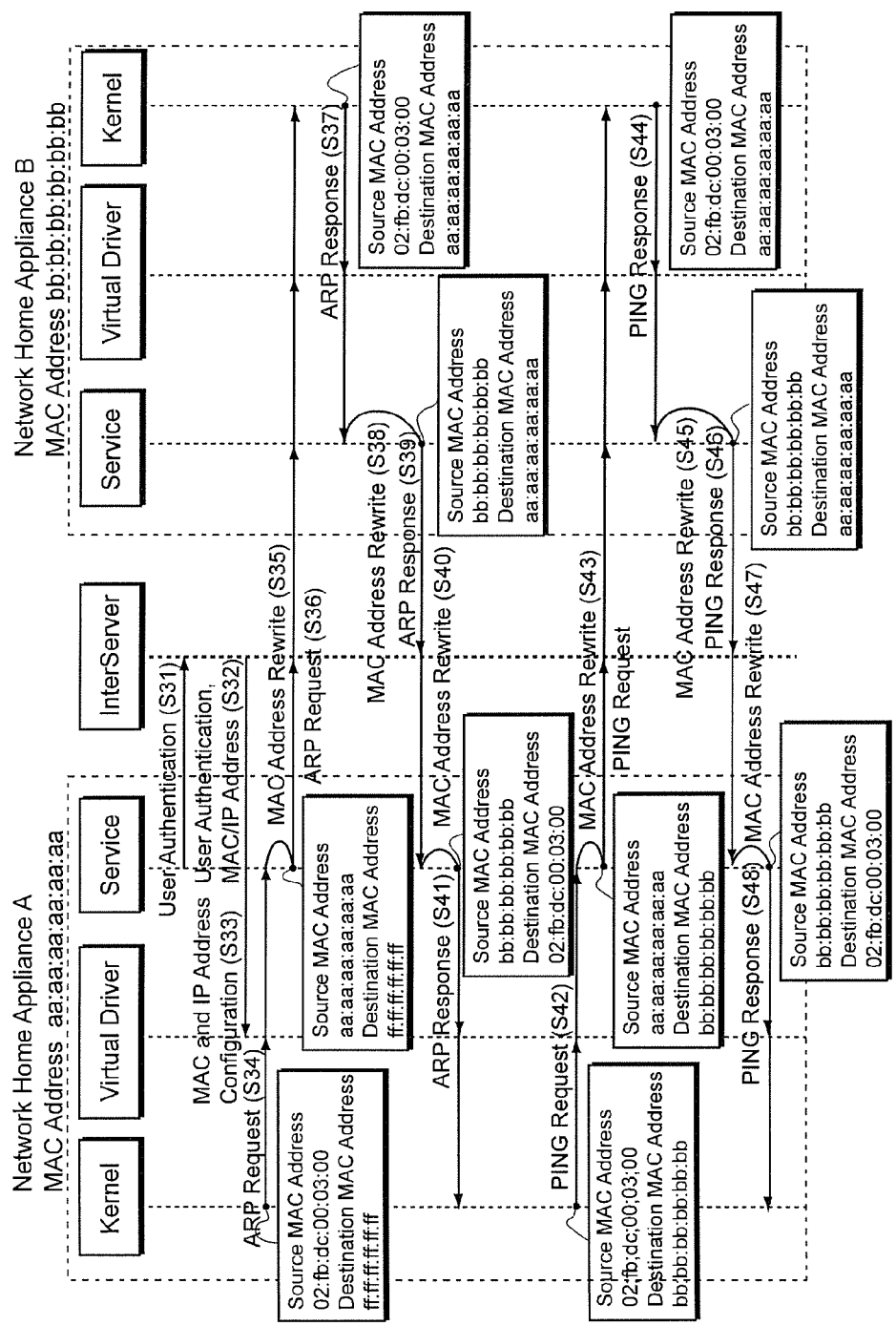
FIG. 14 is a process diagram showing a communication sequence at a Microsoft Windows (R) terminal.

For example, FIG. 14 is a MAC address processing flow showing a source network home appliance A communicating with a destination Internet home appliance B with a known IP address on the virtual private network, and executing the ping command. Note that S31-S48 in the figure correspond with steps S31-S48 in the following discussion, respectively.

S31-S33: Service program 56 connects with the InterServer 6 via the Internet, performs the user authentication and establishes a tunneling TCP session as well as receiving the MAC address (e.g., 00:80:6D:03:EE) and IP address (e.g., 10.10.0.1) of the relay device and configuring the addresses in a driver of the virtual Ethernet device 55. The above TCP session will be kept alive by the service program which sends a predetermined packet at a certain interval.

S34: The Windows client (network home appliance A) generates a ping request for the communication destination network home appliance B, the OS 53 (kernel) broadcasts an ARP request packet in order to identify the communication destination party, and the ARP request packet is written into the virtual Ethernet device 55 of the client.

S35 and S36: the service program 56 for virtual network communications activated as a Windows service retrieves the ARP request packet from the virtual Ethernet device 55, rewrites the communication source fixed MAC address in the ARP request packet to the MAC address for communications, encapsulates the ARP request packet and sends it to the InterServer 6. The InterServer 6 routes the ARP request to the communication destination relay device based on the IP address and the ARP request is received by the service program 56 of the communication destination relay device and written into the virtual Ethernet device 55.

S37-S39: After the OS 53 (kernel) writes a response packet for the ARP request in the virtual Ethernet device 55, the service program 56 retrieves the ARP response packet from the virtual Ethernet device 55, rewrites the communication source (fixed) MAC address in the ARP response packet to the MAC address for communications, encapsulates the ARP request packet and sends it to the InterServer 6.

S40 and S41: Upon receipt of the ARP response packet routed by the InterServer 6, the service program 56 writes the destination MAC address of the ARP response packet back over the MAC address in the virtual Ethernet device 55.

S42: After receiving the ARP packet, the OS 53 (kernel) specifies the destination MAC address and creates a ping packet.

S43: The service program 56 retrieves the ping request packet from the virtual Ethernet device 55, rewrites the source MAC address in the ping request packet to the MAC address for communications, encapsulates the ping request packet and sends it to the InterServer 6.

S44: After the destination service program in the destination party receives the (encapsulated) ping request packet via the InterServer 6, this service program 56 rewrites the destination MAC address in the ping request packet to the MAC address of the virtual Ethernet device 55 into this virtual Ethernet device 55.

S45 and S46: After the kernel writes a response packet for the ping request into the virtual Ethernet device 55, the service program 56 retrieves the ping response packet from the virtual Ethernet device 55. This service program 56 rewrites the source MAC address in the ping response packet to the MAC address for communications, encapsulates the ping response packet, and sends it to the InterServer 6.

S47 and S48: After the destination service program 56 in the destination party receives the (encapsulated) ping response packet via the InterServer 6, this service program 56 rewrites the destination MAC address in the ping response packet to the MAC address of the virtual Ethernet device into this virtual Ethernet device 55.

In this manner, even when all the MAC addresses of the Ethernet device are identical, communications via the hub becomes possible by rewriting the MAC address with the service program. As described above, the above MAC address for rewriting (aa:aa:aa:aa:aa:aa, bb:bb:bb:bb:bb:bb or the like) is assigned and managed by the InterServer 6.

Note that in the same Windows OS, a program installed in the relay device of the present embodiment may be adapted to a PPP connection which does not use the hub as discussed above, wherein only IP addresses are required but not MAC addresses. However, this client network interface for Windows is entirely implemented in the form of the virtual Ethernet device, the MAC address resolution by ARP is required before reaching the network. This ARP request should not be ignored: if it is ignored, the kernel determines that there is no communication destination party and does not send actual packet data. For this reason, the service program 56 (routing processing section 13) has the following functions in this case.

Upon retrieving the ARP packet from the virtual Ethernet device, the service program dynamically generates a dummy MAC address, which does not actually exist, generates an ARP response packet and writes it into the virtual Ethernet device.

After receiving the ARP response, the kernel regards the dummy MAC address as the destination and writes the real data frame into the virtual Ethernet device.

The service program retrieves the real data frame and sends it to the network after removing an Ethernet header (MAC address) from it.

Upon receipt of IP packet data from the network, the service program adds the header (MAC address) to the IP packet and writes it into the virtual Ethernet device. The fixed MAC address is specified as the destination MAC address and the dynamic MAC address generated by the service program is specified as the source MAC address.

Figure 15:
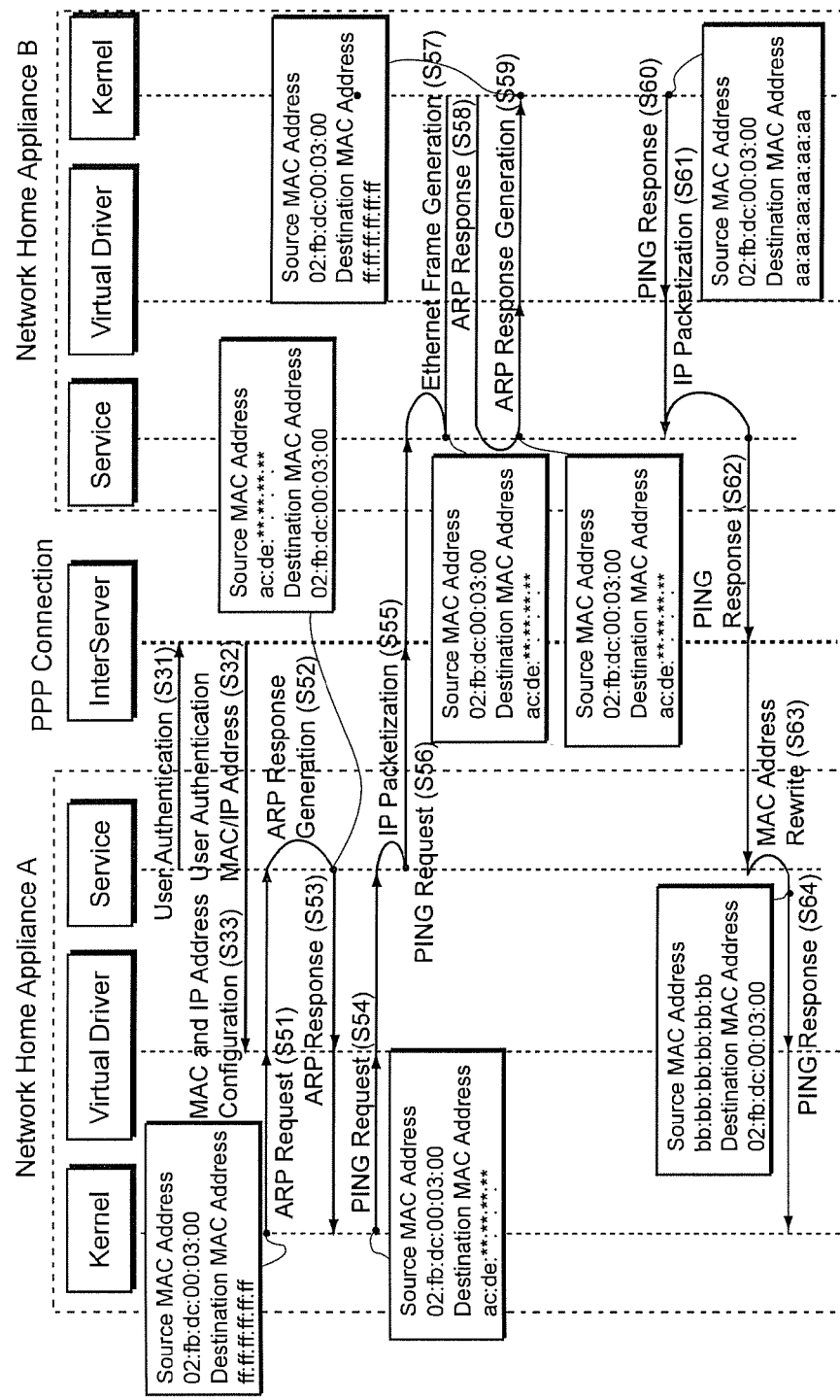
FIG. 15 is a process diagram showing a communication sequence at a Microsoft Windows (R) terminal.

For example, FIG. 15 is showing a MAC address processing flow for a source network home appliance communicating with a destination which is another Internet home appliance with a known IP address on the virtual private network, and executing the ping command.

S31-S33: Service program 56 connects with the InterServer 6 via the Internet, performs the user authentication and establishes a tunneling TCP session as well as receiving the MAC address (e.g., 00:80:6D:03:EE) and IP address (e.g., 10.10.0.1) of the relay device and configuring the addresses in a driver of the virtual Ethernet device 55. The above TCP session will be kept alive by the service program which sends a predetermined packet at a certain interval.

S51: If the network home appliance 2 issues ping towards other PPP terminals (other network home appliances), the OS 53 (kernel) broadcasts an ARP request packet in order to identify the communication destination. Accordingly, the ARP request packet is written into the virtual Ether device 55 of the client.

S52: The service program 56 activated as a Windows service retrieves the ARP request packet from the virtual Ethernet device 55, dynamically generates an ARP response packet within the service program and writes it into the driver. Here, the destination MAC address required for the response packet is the MAC address of the virtual Ethernet device 55 and the source MAC address is generated and specified within the service program 56 as a PPP dynamic MAC address. In this embodiment, it is generated as fixed 2 Bytes added before the IP address. For example, if the destination IP address is 255.255.255.255, the generated MAC address will be ac:de:ff:ff:ff:ff. Although there is nearly zero possibility that a network device exists with a dynamically generated MAC address, even if it does exist, actual communications will not be affected.

S53: The OS 53 (kernel) receives the ARP response written in the virtual Ethernet device and recognizes that the destination's MAC address (PPP dynamic MAC address) is obtained.

S54: OS 53 (kernel) writes a data packet for the PPP dynamic MAC address obtained from the ARP response into the virtual Ethernet device 55.

S55 and S56: The service program 56 retrieves the data packet written in the virtual Ethernet device 55, removes the portion in which the MAC address is described (Ethernet header portion) and sends the remaining IP packet portion as data (encapsulation of the IP packet) to the InterServer (for PPP) 6.

S57: After the IP packet data delivered to the destination via the InterServer (for PPP) 6 is received by the destination's service program, this service program 56 adds the destination MAC address to the received data to create the form of Ethernet frame and writes it into the virtual Ethernet device. The MAC address of the virtual Ethernet device is specified as the destination MAC address, and the source MAC address is dynamically generated within the service program. The generation logic for this is the same as in the step S52.

S58-S64: The ping response packet is returned in the same manner as in the above steps S51-S57.

Thus, this dynamic generation of the dummy MAC address by the service program 56 allows the PPP communication in Windows as well. Note that the above MAC address for rewriting is assigned and managed by the InterServer 6.

Next, a case for Linux operating system will be discussed.

As described above, in the Ethernet connection with the InterServer as a hub, a communication destination party is identified with source and destination MAC addresses of the packet and therefore, successful communication cannot be achieved if the destination MAC address is unknown or if a plurality of terminals have an identical MAC address. In the case of Windows as discussed above, an identical MAC address is assigned to all virtual Ethernet device due to the OS restriction and that MAC address must be rewritten. In the Linux environment, there is no such restriction as in Windows and a unique MAC address is assigned to each virtual Ethernet device.

Figure 16:
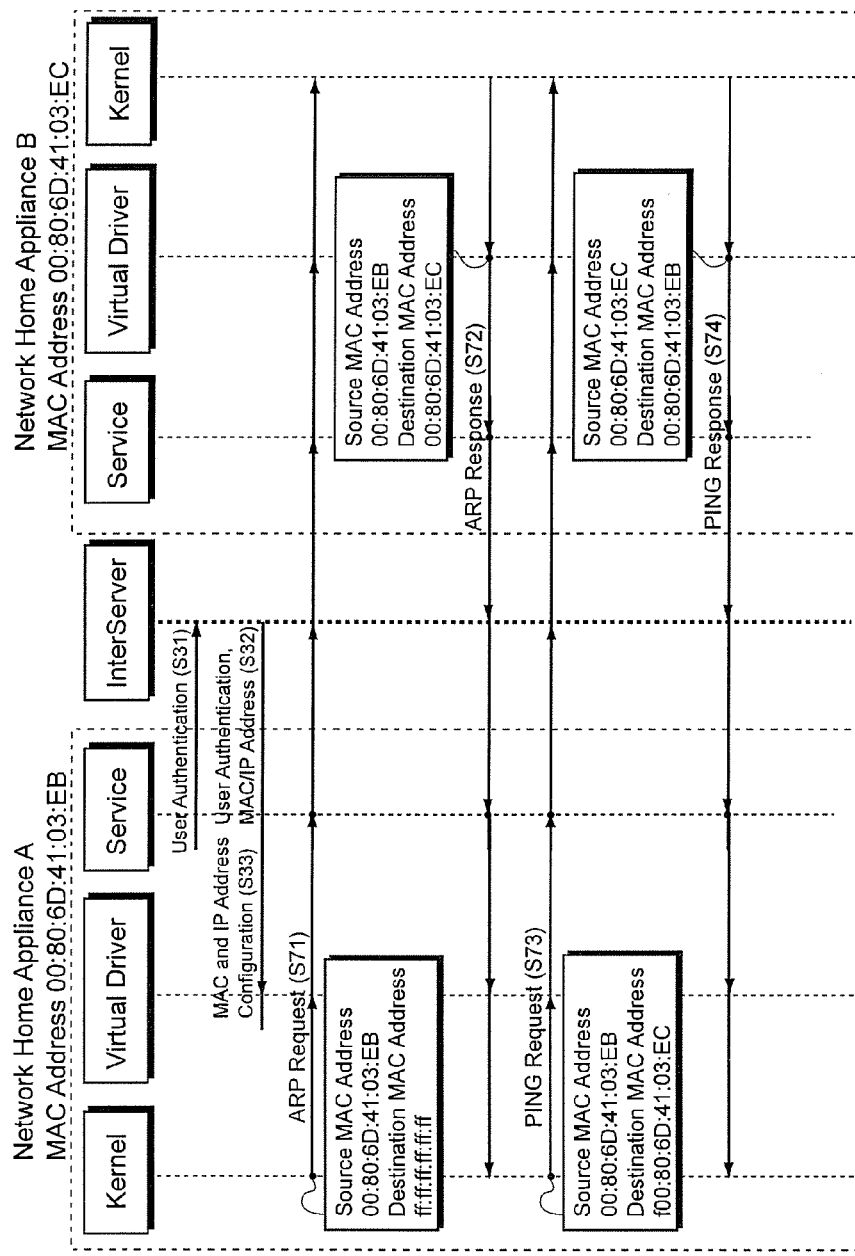
FIG. 16 is a process diagram showing a communication sequence at a Linux (R) terminal.

In this case, FIG. 16 is a MAC address processing flow showing a source network home appliance 2 communicating with a destination Internet home appliance with a known IP address on the virtual private network, and the network home appliance 2 executing the ping command. Note that S31-S48 in the figure correspond with steps S31-S48 in the following discussion, respectively.

S31-S33: Service program 56 connects with the InterServer 6 via the Internet, performs the user authentication, receives the MAC address (e.g., 00:80:6D:03:EB) and IP address (e.g., 10.10.0.1) of the relay device and configures the addresses in the driver of the virtual Ethernet device 55.

S71-S74: Therefore, the relay device establishes a communication session using the MAC and IP addresses configured as above.

Note that no processing on the MAC address is necessary when handling a PPP connection in the Linux environment and therefore, the MAC address assignment from the InterServer is not required in this case. Hence, once the service program connects with the InterServer 6, authenticates the user and receives the IP address, the connection with the destination network home appliance is performed using the IP address.

According to such a structure, if there are multiple InterServers 6, the establishment of the tunneling connection may still be ensured through one of them.

It is to be understood that the embodiment heretofore described is no more than one embodiment of the present invention, and that various changes and modifications can be made without departing from the scope and spirit of the present invention.

For example, although the tunneling connection may be established by either the relay device 3 or the InterServer 6 in the above one embodiment, it is assumed that the tunneling connection is typically established only by the relay device 3 in actual commercial services. This is due to a rarity of fixed IP services with IPv4. This is because routing is impossible if the IPv4 session itself is actually disconnected: in this case, the configuration remains intact once the tunneling (in practice IPv4 connection itself) is established until this IPv4 session is disconnected, and the next IPv4 of the relay device 3 is seldom the same as before.

Also, although the above one embodiment was illustrated with IPv4 as the first protocol and IPv4 as the second protocol, the present invention is not limited to these protocols. The first protocol may be IPv6. Also both the first and the second protocols may be IPv6. Furthermore both may be other than the above protocols.

In the above one embodiment, the relay device 3 is integrally provided with each network home appliance but it may be separately provided and one relay device may be shared by a plurality of network home appliances. Also the network home appliance and the relay device may be connected via LAN.

What is claimed is:

1. A method for connecting a client device to a virtual private network via a server on an Internet network via an Internet connection system, wherein said Internet connection system comprising said client device, a relay device connected to said client device in a private network, and said server connected to the Internet network, said server also connected with said client device through the Internet network and said relay device, comprising the steps of:
   (a) notifying said relay device of an IP address of said server;
   (b) establishing a TCP/IP session through a tunneling connection between said relay device and said server using the notified IP address; and
   (c) based on information received from said relay device or said client device via the Internet, grouping a plurality of relay devices in different private networks or client devices connected to said plurality of relay devices, for each of said relay devices a tunneling connection with said server is individually established, wherein said plurality of relay devices or client devices are considered to be connected to one virtual private network, said grouping being carried out by said server,
   the grouping in the step (c) further comprises:
      assigning by said server a specific virtual server within the server to said client device;
      routing communications by said virtual server between said client device and other client devices which belong to the same virtual private network;
      determining by said server a model of the client device based on an IP address assigned to the client device; and
      determining by said server based on this model the virtual private network to which said client device belongs.

2. The method of claim 1, wherein:
   each of said relay devices is installed in a respective client device.

3. The method of claim 1, wherein:
in said step (a), said relay device connects to a tunneling mediation server provided on the Internet, and receives the IP address of said server from said tunneling mediation server.

4. The method of claim 1, wherein:
said step (b) includes the steps of:
(b-1) connecting to said server by said relay device using the notified IP address of said server; (b-2) notifying said relay device of an IP address assigned for said relay device for establishing a TCP/IP session with tunneling; and
(b-3) establishing a TCP/IP session with tunneling between said server and said relay device.

5. The method of claim 4, wherein:
in said step (b-2), said server notifies said relay device of the IP address of said relay device for establishing a TCP/IP session with tunneling.

6. The method of claim 4, wherein:
said step (b) further includes the step of:
(b-4) generating a MAC address for said relay device and notifying said relay device of said MAC address by said server.

7. The method of claim 4, wherein:
said step (b-1) includes the step of performing connection authentication for said relay device by said server; and
said step (b-2) includes the step of assigning an IP address for said relay device depending on a result of said connection authentication.

8. The method of claim 7, wherein:
said step (b-2) further includes the step of assigning a MAC address for said relay device depending on a result of said connection authentication.

9. The method of claim 7, wherein:
the grouping of said step (c) is performed based on the connection authentication of said step (b-1).

10. The method of claim 4, wherein:
in said step (a), said relay device connects to a tunneling mediation server provided on the Internet, and receives the IP address of said server from said tunneling mediation server; and
in said step (b-2), said tunneling mediation server notifies said relay device of the IP address of said relay device for establishing a TCP/IP session with tunneling.

11. The method of claim 10, wherein:
said step (b) further includes the step of:
(b-4) generating the MAC address for said relay device and notifying said relay device of said MAC address by said tunneling mediation server.

12. The method of claim 1, wherein:
the grouping of said step (c) is performed based on an IP address of said relay device or said client device assigned by said server.

13. A server located on the Internet used by an Internet connection system,
wherein said Internet connection system comprises said server, a client device and a relay device connected to said client device within a private network, and said server connects with said client device through the Internet and said relay device,
said server comprising:
a tunneling establishing section for establishing tunneling connections with a plurality of said relay devices located in difference private networks; and
a terminal group management section configured to create a virtual private network group with the plurality of relay devices or client devices connected with this server by tunneling, based on information received from said client device or said relay device via the Internet,
wherein said server assigns a specific virtual server within the server to said client device;
wherein said virtual server routes communications between said client device and other client devices which belong to the same virtual private network;
wherein said server determines a model of the client device based on an IP address assigned to the client device; and
wherein said server determines based on this model the virtual private network to which said client device belongs.

14. The server of claim 13, further comprising:
a model identification section for determining if said client device and/or said relay device are/is of predetermined models,
wherein said terminal group management section manages the result from said model identification section in association with said client device.

15. The server of claim 14, further comprising:
a command conversion section for converting a command to be sent to said client device to a command in a predetermined format for controlling said client device based on a model determined by said model identification section.

16. The server of claim 13, further comprising:
a protocol identification section for determining a protocol for controlling said client device,
wherein said terminal group management section builds a network group to which client devices belong, said client devices utilizing a same protocol, based on the result from said protocol identification section.

17. The server of claim 13, wherein:
said terminal group management section manages a plurality of virtual private network group, and selects a group to which said client device or said relay device should belong based on information from said client device or said relay device.

18. The server of claim 13, wherein:
said client device includes a peripheral device, said peripheral device communicable with said relay device but unable to connect to the Internet by itself.

19. The server of claim 13, further comprising:
a state information obtaining section for obtaining at least one of, or a plurality of: an operation state, a usage state and location information of said client device and/or said relay device.

20. The server of claim 13, further comprising: an address management section for assigning an IP address on a virtual private network to said client device and/or said relay device.

21. The server of claim 20, wherein:
said address management section assigns a unique MAC address to said client device and/or said relay device for connecting via said virtual private network.

22. An Internet connection system comprising:
a server located on the Internet and a plurality of network-enabled home appliances, each comprising a relay device adapted to receive an IP address of the server, said network-enabled home appliances, said relay device and said server connected to the Internet, said server also connected with said network-enabled home appliances through said relay device and the Internet, wherein, the server comprises:
a tunneling establishing section for establishing a tunneling connection with a network enabled home appliance;

a model identification section for determining a model of the network enabled home appliance based on an IP address assigned to the network enabled home appliance, wherein the server is adapted to determine based on this model a virtual private network group to which the network enabled home appliance belongs; and the server is adapted to assign a specific virtual server within the server to the network enabled home appliance, the virtual server routing communications between the network enabled home appliance and other network enabled home appliances, for each of which a tunneling connection with the server is established and which belong to the same virtual private network group; and each of the plurality of network-enabled home appliances comprises:
a control section for receiving a packet, said packet including a predetermined command, and controlling said network home appliance based on said command;
a server address storage section for storing a global IP address of the server;
a tunneling establishing section for establishing a tunneling TCP session between the relay device of each network-enabled home appliance and the server based on the global IP address of the server;
a group information storage section for receiving from said server an assigned terminal group to which the network enabled home appliance belongs and information of other network home appliances belonging to the same virtual private network group, and storing the information; and
a packet processing device for capsulating/decapsulating packets, said packets communicated with the server through said tunneling connection, and routing the packet including the predetermined command to the control section or routing packets destined to the other network home appliances to the server.

23. The Internet connection system of claim 22, wherein each of the plurality of network-enabled home appliances further comprises:
a relay device address storage section for making an authenticated connection with said server before said tunneling establishing section establishes the tunneling connection, receiving from said server an IP address on virtual private network based on the authenticated connection, and storing the IP address.

24. The Internet connection system of claim 22, wherein each of the plurality of network-enabled home appliances further comprises:
a relay device address storage section for making an authenticated connection with said server before said tunneling establishing section establishes the tunneling connection, receiving from said server an MAC address on virtual private network based on the authenticated connection, and storing the MAC address.

25. The Internet connection system of claim 22, wherein each of the plurality of network-enabled home appliances further comprises an address generation section for rewriting a MAC address of a virtual network device in an address request/response packet to the MAC address received from said server when receiving from said server the information of other network home appliances belonging to the same virtual private network group.

26. The Internet connection system of claim 22, wherein each of the plurality of network-enabled home appliances further comprises:
a mediation server address storage section for storing an address of a tunneling mediation server located on the Internet; and
a server address obtaining section for accessing said mediation server based on the mediation server address, and receiving said global address of said server from said mediation server.

27. A client device, comprising:
a server address storage section that stores a global address of a server located on the Internet;
a tunneling establishing section that establishes a TCP/IP session through a tunneling connection between said client device and said server based on the global address of the server;
a group information storage section that receives and stores an assignment of a virtual private network group from said server and information of other client devices located in different private networks that are separated by the Internet and belonging to the same virtual private network group;
a control section that receives a packet, said packet including a command in a predetermined format, and controlling said client device based on said command,
wherein said client device communicates to said other client devices via a virtual server that is located within said server, said client device and said other client devices belonging to the same virtual private network group,
wherein said server determines a model of the client device based on an IP address assigned to said client device, and
wherein said server determines based on this model the virtual private network group to which said client device belongs; and
a packet processing device that capsulates/decapsulates packets, said packets communicated with said server through said tunneling connection, and routing said packets to said control section or to said other client devices in said virtual private network group based on the information in the group information storage section, wherein said command routed to and received at said control section originated from one of said other client devices.

* * * * *